United States Patent [19]

Seikou et al.

[11] Patent Number: 4,779,672
[45] Date of Patent: Oct. 25, 1988

[54] AIR CONDITIONER FOR VEHICLE HAVING BLOWER WITH AUXILIARY INTAKE PORT

[75] Inventors: Kiyokazu Seikou, Toyota; Yoji Nishimura, Okazaki, both of Japan

[73] Assignee: Toyota Jidosha Kabushiki Kaisha, Japan

[21] Appl. No.: 919,041

[22] Filed: Oct. 15, 1986

[30] Foreign Application Priority Data

Nov. 19, 1985 [JP] Japan .................................. 60-177935

[51] Int. Cl.⁴ .......................... B60H 1/00; F28F 27/02
[52] U.S. Cl. ......................................... 165/41; 165/42; 165/43; 165/120; 165/122; 98/2.01
[58] Field of Search ....................... 165/42, 43, 41, 40, 165/96, 100, 122, 124; 98/2.01, 2.06, 2.11

[56] References Cited

U.S. PATENT DOCUMENTS

| | | | |
|---|---|---|---|
| 2,079,157 | 5/1937 | Delin | 165/96 |
| 2,488,267 | 11/1949 | Cassie | 165/100 |
| 2,655,349 | 10/1953 | Beavin | |
| 2,727,680 | 12/1955 | Madison et al. | |
| 3,246,605 | 4/1966 | Fisher | |
| 4,623,090 | 11/1986 | Heger | 236/49 |

FOREIGN PATENT DOCUMENTS

| | | | |
|---|---|---|---|
| 2496016 | 6/1982 | France | 165/42 |
| 58-65109 | 5/1983 | Japan . | |
| 58-192705 | 12/1983 | Japan . | |
| 0102612 | 6/1984 | Japan | 62/243 |

Primary Examiner—Albert W. Davis, Jr.
Assistant Examiner—John K. Ford
Attorney, Agent, or Firm—Parkhurst & Oliff

[57] ABSTRACT

An air conditioner for a vehicle which has a fan of a centrifugal blower used in the air conditioner, the fan having upper and lower fan secitons split by a shield plate with respect to a rotational shaft direction, a normal air intake port formed at either one side of the upper and lower fan section, an increasing air intake port formed at the other of the upper and lower fan sections, and a damper formed at least in the increasing air intake port, the damper being opened only when air intake quantity is necessarily increased or air intake resistance is necessarily decreased. Thus, the air conditioner can increase the effective air intake volume to raise the efficiency of a blower and to simultaneously obtain sufficient air blowing quantity.

3 Claims, 1 Drawing Sheet

AIR CONDITIONER FOR VEHICLE HAVING BLOWER WITH AUXILIARY INTAKE PORT

BACKGROUND OF THE INVENTION

The present invention relates to an air conditioner for a vehicle and, more particularly, to a peripheral construction of a fan of a centrifugal blower for an air conditioner.

A centrifugal blower has been mainly used in an air conditioner for a vehicle to condition the indoor air of the vehicle. A fan of the centrifugal blower is ordinarily rotated by a motor to take in air from one side of a rotational shaft and to exhaust the air in a circumferential direction. The air taken in is normally fresh atmospheric air from outside of the vehicle. When the blowing air quantity increases to a predetermined value or higher, the fan takes in and exhausts recirculated air from the compartment of the vehicle. The prior technique for constructing an air intake port of a conventional air conditioner for the vehicle is disclosed, for example, in Japanese Utility Model Application Laid-open No. 65109/83. This prior art forms an air intake box body in a dome shape so as to smoothly switch the intakes of fresh air and recirculated air and provides a fresh atmospheric air intake port at the dome.

However, the effective air intake volume cannot be altered in the abovementioned prior art and other conventional techniques even if the construction of the periphery of the air intake port of an air intake box body is devised in any way. Thus, if the blowing air quantity must be increased to the maximum, the prior art cannot obtain sufficient air intake volume, thereby reducing the efficiency of the blower, increasing the power consumption and preventing sufficient air blowing quantity.

SUMMARY OF THE INVENTION

Accordingly, an object of the present invention is to provide an air conditioner for a vehicle capable of eliminating the abovementioned drawbacks and increasing effective air intake volume to raise the efficiency of a blower and to simultaneously obtain sufficient air blowing quantity.

According to an air conditioner for a vehicle in accordance with the present invention, air intake ports are formed at both sides of a fan of a centrifugal blower with respect to a rotational shaft direction to thereby increase effective air intake volume.

More particularly, the fan of the centrifugal blower used in the air conditioner is split by a horizontal shield plate into upper and lower sections with respect to the rotational shaft direction, and air intake ports are formed at both sides with respect to the rotational shaft direction. One of the intake ports is used as a normal intake port, and the other is used as an increasing intake port. Further, a damper is formed at the increasing intake port to be opened only when the air intake quantity must be necessarily increased. The reason why the fan is split by the shield plate into upper and lower sections is because the air taken in from both sides is prevented from colliding in the fan causing the air blowing efficiency to decrease.

These and other objects and features will become more apparent from the following description of the preferred embodiments of the present invention when read in connection with the accompanying drawings.

DESCRIPTION OF THE PREFERRED EMBODIMENTS

Figure 1:
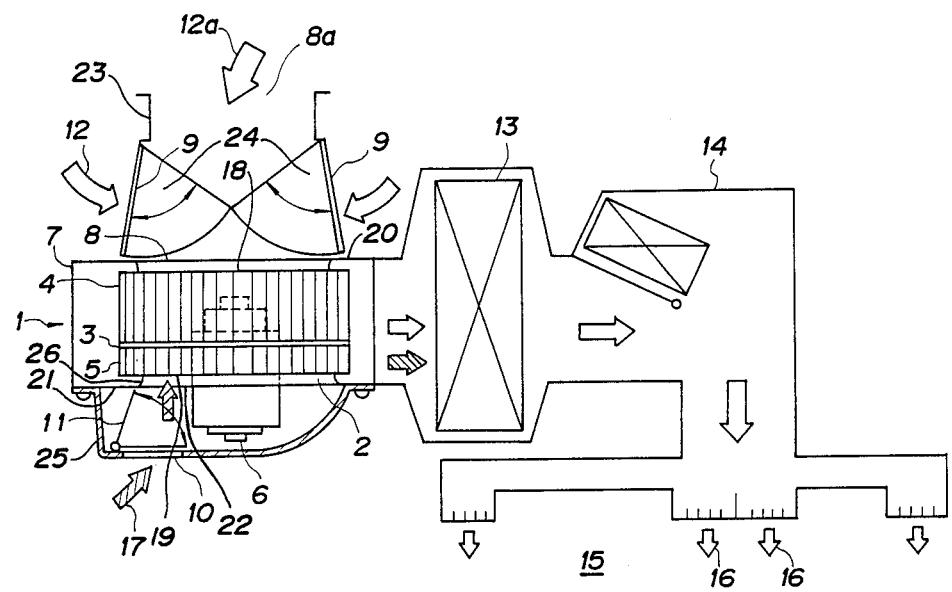
FIG. 1 is a schematic front view of an embodiment of an air conditioner for a vehicle according to the present invention.

An embodiment of the present invention will be described in detail with reference to FIGS. 1 and 2. FIG. 1 is a schematic front view of an air conditioner for a vehicle according to an embodiment of the present invention. A centrifugal fan 2 of a blower 1 is formed substantially in a cylindrical shape of a number of blades. The centrifugal fan 2 has axially opposite ends 18, 19 through which air flows into the centrifugal fan. This centrifugal fan 2 is split by a horizontal shield plate 3 into upper and lower sections with respect to a rotational shaft direction. The split upper and lower fan sections 4 and 5 are rotated integrally by a motor 6. A rotational shaft is disposed in an elevational direction. An air intake box body 7 accommodates the centrifugal fan 2 and has a first wall portion 20 including a first suction port 8 closely adjacent to one open end 18 of the fan 2 and a second wall portion 21 including a second suction port 22 formed by an inwardly extending flange 26, closely adjacent to the other open end 19 of the fan 2. A first air induction portion 23 is connected to the first wall portion 20 and has a fresh-air inlet 8a and a first recirculated-air inlet 24 both adapted to be communicated with the one open end 18 of the fan 2. A damper 9 is provided to cover the first suction port 8. The air conditioner can be switched to recirculated air or fresh air mode by the operation of the damper 9. A second air induction portion 25 is connected to the second wall portion 21 and has a second recirculated-air inlet 10 opposite to the other open end 19 of the fan 2 and a damper 11 for opening and closing the second recirculated-air inlet 10. The second recirculated-air inlet 10 is formed at the bottom of the air intake box body 7. The motor 6 is separated from the lower inner surface of the intake box body 7 to sufficiently take in the recirculated air from the lower open end of the fan 2.

The operation of the embodiment described will be explained in detail. The damper 11 of the second recirculated-air inlet 10 is closed in a normal air blowing of the air conditioner. The damper 9 covers the fresh-air inlet 8a in the recirculated air mode, and air 12 which has been taken in is taken in from the first suction port 8. The recirculated air 12 passes an evaporator 13 and a heater unit 14 to be blown into the compartment 15 of the vehicle, for example, as cold air 16. Then, when air blowing quantity further increases to exceed a predetermined quantity, the damper 11 of the second recirculated air inlet 10 is opened to take in recirculated air 17 from below the fan 2. At this time, an air intake volume increases by several tens percent as compared with the conventional air conditioner to obtain sufficient air intake volume. Therefore, air blowing efficiency is increased to reduce power consumption. Further, since intake resistance is small even if air blowing quantity is increased, the rotating speed of the motor 6 is not necessarily accelerated to maintain the compartment in the vehicle steady. Thus, since the air taken in from both sides does not collide causing the air taken in to be turbulent by the operation of the shield plate 3 in case of taking in the air from both sides of the fan 2 with respect to the rotational shaft direction, the air blowing efficiency can be further enhanced. The dividing ratio of intaking air in the fan 2 is such that the lower air intake quantity is smaller than the upper air intake quantity. Noise of the motor 6 is not leaked by the damper 11 of the second recirculatedd-air inlet 10 in the normal air blowing operation. Even if the damper 11 of the second recirculated-air inlet 10 is opened, the rotational shaft direction of the fan 2 is directed in elevational directions in the embodiment described above so that the noise of the motor is generated toward the floor of the compartment 15 in the vehicle, and it does not disturb the steady state in the compartment.

The damper 9 opens the fresh air inlet 8a in a fresh air mode, and fresh air 12a is taken in from the first suction port 8. Inner air 17 can be taken in from the second recirculated-air inlet 10 at this time to provide the effect of enhancing the air blowing efficiency and cooling-/heating efficiency.

Figure 2:
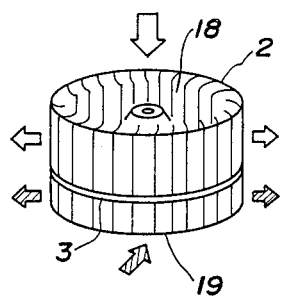
FIG. 2 is a perspective view of a fan in FIG. 1.

In the embodiment described above, a multiblade blower of centrifugal type has been described (as shown in FIGS. 1 and 2). However, the present invention is not limited to the particular embodiment. For example, the word "fan" used in the specification includes a blower having higher compression ratio than the ordinary fan.

According to the air conditioner for a vehicle of the present invention, the fan of the centrifugal blower is split by the horizontal shield plate into upper and lower sections with respect to the rotational shaft direction to provide air intake ports at both sides of the rotational shaft direction. Therefore, the air conditioner of the invention can obtain sufficient air intake volume to enhance the air blowing efficiency and to suppress the power consumption.

What is claimed is:

1. An air conditioner having a fan section and an air conditioning section connected to a discharge side of said fan section to receive air therefrom, said fan section comprising:
    a centrifugal fan (2) having axially opposite open ends (18, 19) through which air flows into the centrifugal fan;
    an air intake box body (7) accommodating said centrifugal fan (2), said air intake box body (7) having a first wall portion (20) including a first suction port (8) closely adjacent to one of the open ends (18) of said fan (2) and a second wall portion (21) including a second suction port (22) formed by an inwardly extending flange (26) closely adjacent to the other open end (19) of said fan (2);
    a first air induction portion (23) connected to said first wall portion (20), said first induction portion (23) having a fresh-air inlet (8a) and a first recirculated-air inlet (24) both adapted to be communicated with said one open end (18) of said fan (2); and
    a second air induction portion (25) connected to said second wall portion (21), said second air induction portion (25) having a second recirculated-air inlet (10) opposite to the other open end (19) of said fan (2) and a damper means (11) for opening and closing said second recirculated-air inlet (10).

2. The air conditioner according to claim 1, wherein said first suction port (8) is formed at an upper portion of said air intake box body (7).

3. The air conditioner according to claim 1, wherein said centrifugal fan (2) is formed substantially in a cylindrical shape of a number of blades.

* * * * *